June 7, 1938.     W. NOVEY ET AL     2,120,113
METHOD OF ASSEMBLING AN OIL SEAL RING
Original Filed July 11, 1936
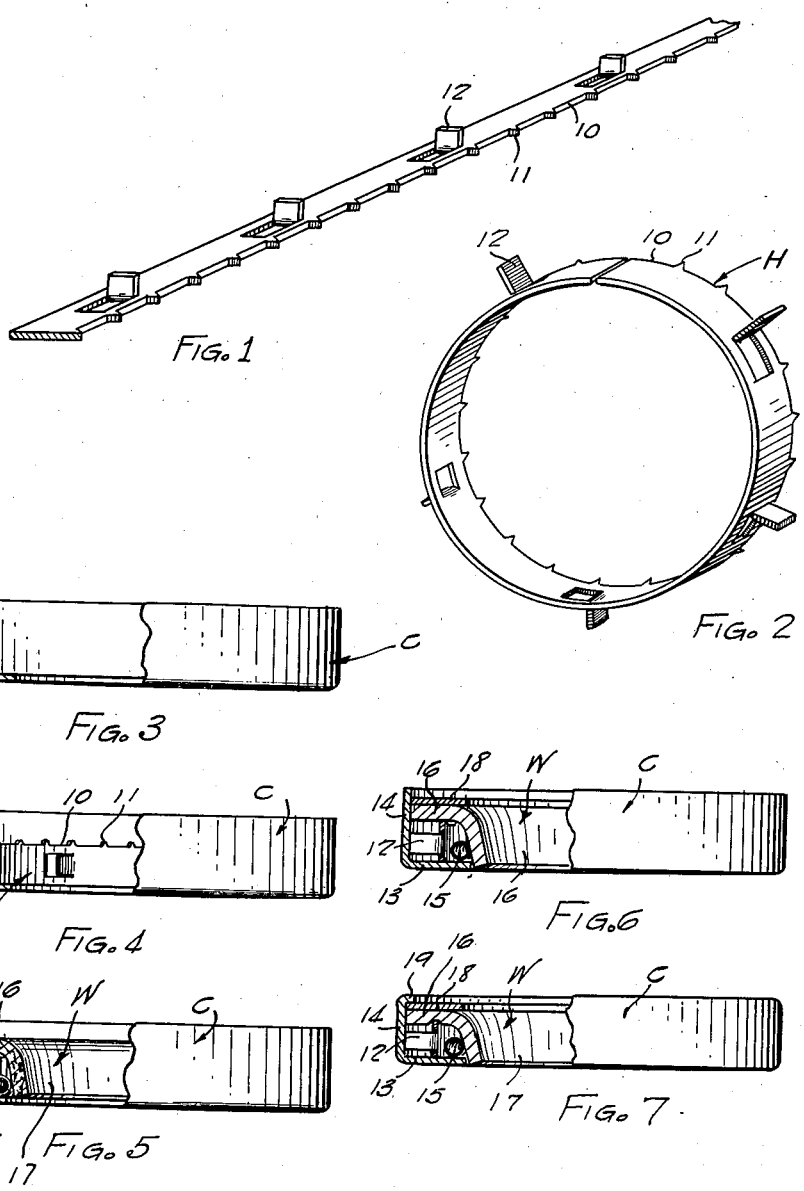
INVENTOR.
WILLIAM NOVEY &
JOHN G. TROMBA.
BY
ATTORNEY.

Patented June 7, 1938

2,120,113

UNITED STATES PATENT OFFICE 2,120,113

METHOD OF ASSEMBLING AN OIL SEAL RING

William Novey and John C. Tromba, Torrington, Conn., assignors to The Fitzgerald Manufacturing Company, Torrington, Conn., a corporation of Connecticut Original application July 11, 1936, Serial No. 90,097. Divided and this application October 9, 1936, Serial No. 104,782

2 Claims. (Cl. 29—148)

This invention has to do with the method of assembling oil seal rings such as are commonly employed in association with the axles of motor vehicles to prevent the leakage of oil therealong.

This application is a division of the co-pending application of Novey and Tromba, Serial Number 90,097, filed July 11, 1936, entitled "Oil seal ring and method of assembly." The invention is concerned primarily with the method of assembling the oil seal ring shown in the co-pending application.

The invention is concerned with the method of assembling an oil seal ring comprising a casing defining a channel-like structure in which is housed a flexible washer having a tubular extending portion about which is disposed a garter spring. A hold strip or ring formed with projections for maintaining the same spaced from the cylindrical wall of the casing is included in the casing, and has teeth formed along one edge, and which teeth bite into the flexible washer.

This invention has in view as an object the provision of a method in which the hold strip or ring is first formed by metal stamping operations which form a strip which is bent into its ultimate ring-like formation. The casing element is then formed from sheet metal by appropriate metal stamping operations to be hereinafter described in detail, and the ring and other elements assembled therewith in the novel manner constituting the present invention.

Various other more detailed objects and advantages will in part become apparent, and in part be hereinafter stated, as the description of the invention proceeds.

The invention, therefore, comprises the method of assembling an oil seal ring of the character above noted, and which method includes the step of first stamping a hold ring from a strip of sheet metal, and bending into ring-like formation; stamping a metal casing from sheet metal, and then assembling the hold strip or ring, flexible washer and garter spring with the casing and ring in the manner provided by this invention.

For a full and more complete understanding of the invention, reference may be had to the following description and accompanying drawing, wherein Figure 1 is a view in perspective of a strip of metal after the initial stamping operation, employed to form the hold strip or ring, Figure 2 is another perspective illustration, bringing out the construction of the hold ring per se, Figure 3 is a side view, partly in section and partly in elevation, bringing out one step in the formation of the seal ring casing, Figure 4 is another side view similar to Figure 3, showing the hold ring as assembled in the casing, Figure 5 is another showing similar to Figures 3 and 4, bringing out the manner in which the flexible washer and garter spring are assembled in the casing, Figure 6 is another similar view, showing the assembly of the flat ring member which completes the casing structure, and Figure 7 is another view showing the completely assembled oil seal ring.

Referring now to the drawing, wherein like reference characters denote corresponding parts, a hold strip or ring is shown in Figure 2, and referred to by the reference character H. This ring H is formed by first stamping from sheet metal a strip such as shown in Figure 1. This strip has one edge, referred to as 10, formed with a plurality of teeth 11, while a plurality of lugs 12 are formed in the strip itself, and spaced a suitable distance apart.

After the strip, shown in Figure 1, has been stamped from sheet metal, it is bent into the ring-like formation, brought out in Figure 2, to provide the completed hold ring H.

Referring now more particularly to Figure 3, there is illustrated a cup shaped member C, which comprises a flat ring-like wall 13, and a cylindrical wall 14. This member C may be made by subjecting a properly dimensioned ring of metal to the effect of dies, to form it into the cup shaped structure shown.

Figure 4 shows the hold ring H as assembled with the cup shaped member C, and it is notable that the lugs 12 serve to properly position this ring H within the cup shaped member C, as the engagements of these lugs 12 with the inner surface of the wall 14 properly space the ring H therefrom.

Figure 5 develops a flexible washer W, which may be made from leather, or any suitable fibrous material, and a garter spring 15 assembled in the cup shaped casing member C. It is notable that the washer W is formed with a flat ring-like wall 16, which engages the teeth 11 of the hold ring H, and a tubular-like portion 17, which is intended to encompass a shaft with which the seal ring is associated. The garter spring 15 is disposed about the tubular portion 17, to have the desired gripping effect thereon.

In Figure 6 the assembly is shown with the addition of another ring-like wall element 18, which completes the casing structure.

As shown in Figure 7 the free edge of the cylindrical wall 14 is peened or bent over the member 18, to maintain the elements in their assembled relationship. This bent edge is referred to at 19.

It is notable that prior to bending over of the free edge of the cylindrical wall 14, pressure is applied to the member 18, so that the portion 16 of the washer W is forced down over the teeth 11. The application of this pressure prior to the formation of the lip flange 19 insures of the flexible washer being properly positioned in the assembly.

While a prefered specific embodiment of the invention is hereinbefore set forth, it is to be clearly understood that we are not to be limited to the exact steps illustrated and described, because various modifications of these details may be provided in putting the invention into practice within the purview of the appended claims.

We claim:

1. The method of assembling an oil seal ring of the character described, which consists in first forming a hold ring by stamping a strip of metal having pointed teeth along one edge from sheet material, and then bending the strip into ring form, then forming a cup shaped casing member by metal stamping operations, positioning the hold ring in the cup shaped member, assembling a flexible washer and garter spring within the cup shaped member with the flexible washer engaging the edge of the hold ring having the teeth, placing an end wall member over said flexible washer, subjecting said end wall to pressure to force the washer into intimate engagement with the edge of the hold ring having the teeth, and then bending over the free edge of the cylindrical wall of the cup shaped member to maintain the parts in assembled relationship.

2. The method of making an oil seal ring of the character described which consists in first stamping a strip of metal from sheet material, at the same time forming lugs on the strip, and teeth along one edge thereof, bending said strip into ring-like formation to define a hold ring with the lugs extending radially outwardly, forming a cup shaped member by metal stamping operations, said cup shaped member having an end wall and a cylindrical wall, positioning said hold ring within the cup shaped member with the lugs engaging the cylindrical wall, and the edge which is free from the teeth engaging the end wall, then placing a flexible washer having a flat ring wall, and a tubular portion, within the cup shaped member, there being a garter spring disposed about the tubular portion, and the flat wall engaging the teeth of the hold ring, then placing a second end wall element in engagement with the flexible washer, applying pressure to said end walls to force the flexible washer over the teeth of the hold ring, and then forming a bead or flange on the free edge of the cylindrical wall to maintain the parts in assembled relation.

WILLIAM NOVEY.
JOHN C. TROMBA.